US012687741B2

(12) United States Patent
Cheung et al.

(10) Patent No.: US 12,687,741 B2
(45) Date of Patent: Jul. 21, 2026

(54) SMART GLASSES AND POSITION ADJUSTING END PIECE THEREOF

(71) Applicant: SOLOS TECHNOLOGY (SHENZHEN) LIMITED, Shenzhen (CN)

(72) Inventors: Wai Kuen Cheung, Shenzhen (CN); Kwok Wah Law, Shenzhen (CN); Chiu Ming So, Shenzhen (CN); Chiu Kan Tsang, Shenzhen (CN)

(73) Assignee: SOLOS TECHNOLOGY (SHENZHEN) LIMITED, Shenzhen (CN)

( * ) Notice: Subject to any disclaimer, the term of this patent is extended or adjusted under 35 U.S.C. 154(b) by 317 days.

(21) Appl. No.: 18/388,876

(22) Filed: Nov. 13, 2023

(65) Prior Publication Data

US 2024/0077749 A1      Mar. 7, 2024

Related U.S. Application Data

(63) Continuation of application No. PCT/CN2022/091813, filed on May 9, 2022.

(30) Foreign Application Priority Data

May 12, 2021    (CN) .......................... 202110518539.6

(51) Int. Cl.
    *G02C 5/22*        (2006.01)
    *G02B 27/01*       (2006.01)
    *G02C 11/00*       (2006.01)
(52) U.S. Cl.
    CPC .......... *G02C 5/22* (2013.01); *G02B 27/0176* (2013.01); *G02B 2027/0178* (2013.01); *G02C 11/10* (2013.01)

(58) Field of Classification Search
    CPC . G02C 5/22; G02C 5/10; G02C 11/10; G02B 27/0176; G02B 27/01; G02B 2027/0178
    (Continued)

(56) References Cited

U.S. PATENT DOCUMENTS 4,673,376 A * 6/1987 Fender ...................... F16D 3/20
                                                    403/290
5,229,795 A * 7/1993 Heintzelman ........ G02C 5/2263
                                                    351/120
(Continued)

FOREIGN PATENT DOCUMENTS

CN        103733120 A      4/2014
CN        104272169 A      1/2015
CN        112305767 A      2/2021

OTHER PUBLICATIONS

Written Opinion of PCT Patent Application No. PCT/CN2022/091813 issued on Jul. 18, 2022.
(Continued)

*Primary Examiner* — William R Alexander

(57)                ABSTRACT

Smart glasses and position adjusting end piece thereof are provided. The smart glasses include: a wearing body provided with a connecting wire, wherein two ends of the connecting wire extend out of two sides of the wearing body respectively; position adjusting end pieces installed on the two sides of the wearing body, which can be rotated around a first direction relative to the wearing body within a first angle range and maintained at any position within the first angle range, and further can be rotated around a second direction relative to the wearing body within a second angle range and maintained at any position within the second angle range; and hinges installed on an end of the position adjusting end pieces away from the wearing body and are
(Continued)

electrically connected to the connecting wire. The smart glasses can fine-tune the shape and adjust the size of the whole smart glasses.

13 Claims, 7 Drawing Sheets

(58) Field of Classification Search
USPC ......................................................... 351/153
See application file for complete search history.

(56) References Cited

U.S. PATENT DOCUMENTS

| | | | | |
|---|---|---|---|---|
| 7,264,349 | B1 * | 9/2007 | Ku ....................... | G02C 5/2263 |
| | | | | 351/120 |
| 2016/0341976 | A1 * | 11/2016 | Ku ........................... | G02C 5/20 |
| 2022/0004021 | A1 * | 1/2022 | Shanelaris ............ | G02C 5/146 |
| 2023/0369741 | A1 * | 11/2023 | Hintermann ............. | H01Q 7/00 |
| 2024/0295750 | A1 * | 9/2024 | Shanelaris ............... | G02C 5/22 |

OTHER PUBLICATIONS

International Search Report of PCT Patent Application No. PCT/CN2022/091813 issued on Jul. 18, 2022.

* cited by examiner

SMART GLASSES AND POSITION ADJUSTING END PIECE THEREOF

CROSS REFERENCE TO RELATED APPLICATIONS

The present application is a continuation-application of International Application PCT/CN2022/091813, with an international filing date of May 9, 2022, which claims foreign priority to Chinese Patent Application 202110518539.6, entitled "SMART GLASSES AND POSITION ADJUSTING END PIECE THEREOF", filed on May 12, 2021 in the China National Intellectual Property Administration, the contents of all of which are hereby incorporated by reference in its entirety.

BACKGROUND

1. Technical Field

The present application generally relates to the technical field of wearable device, and in particular to smart glasses and position adjusting end piece thereof.

2. Description of Related Art

With the development of the wearable technology, smart wearable devices such as smart glasses have become more and more widely used, but some necessary to be improved problems are exposed during the use.

The existing smart glasses are generally assembled in one piece and cannot be disassembled, during the use, since the head size and shape of each user are different, the shape of the smart glasses cannot be changed according to different use requirements, and the front frame design of the same smart glasses cannot meet the wearing needs of the most users.

SUMMARY

The present application provides smart glasses and position adjusting end piece thereof, to fine-tune a shape of the smart glasses, so as to adapt to more wearing requirements of a user, and improve applicability of the smart glasses.

In order to achieve the above-described technical objectives, the present application adopts the following technical solutions:

According to a first aspect, the technical solution of the present application provides smart glasses including:

a wearing body, wherein a connecting wire is provided in the wearing body, and two ends of the connecting wire extend out of two sides of the wearing body respectively;

position adjusting end pieces installed on the two sides of the wearing body, wherein the position adjusting end pieces can be rotated around a first direction relative to the wearing body within a first angle range, and can be maintained at any position within the first angle range, to adjust a forward tilt angle of the position adjusting end pieces relative to the wearing body, and the first direction is parallel to a length direction of the wearing body; the position adjusting end pieces further can be rotated around a second direction relative to the wearing body within a second angle range, and can be maintained at any position within the second angle range, to adjust an opening angle of the position adjusting end pieces relative to the wearing body, and the second direction is parallel to a width direction of the wearing body; and hinges, wherein the hinges are installed on an end of the position adjusting end pieces away from the wearing body, and are electrically connected to the connecting wire.

Preferably, the position adjusting end piece includes: an end piece body and an end piece metal bridge;

the end piece metal bridge is preformed into a set shape, a first end of the end piece metal bridge is detachably connected to the wearing body, a second end of the end piece metal bridge is detachably connected to the end piece body, and a middle part of the end piece metal bridge has a controllable bending section; and the controllable bending section is made of metal material, to enable the controllable bending section to rotate around the first direction within the first angle range, and to be maintained at the any position within the first angle range; and to enable the controllable bending section to rotate around the second direction within the second angle range, and to be maintained at the any position within the second angle range.

Preferably, the first end of the end piece metal bridge includes: a fixing plate connected to the controllable bending section, and a fixing post extending from the fixing plate; a position limiting groove with a shape matching to the fixing post is provided on the wearing body, the fixing post is embedded in the position limiting groove, and the fixing plate is connected to the wearing body through screws.

Preferably, a connecting groove is provided on the end piece body, and an avoidance groove is provided at a bottom of the connecting groove along a third direction and runs through the connecting groove; and the second end of the end piece metal bridge includes a connecting plate and a bar perpendicular to each other, two first fixing holes are provided on the connecting plate, two second fixing holes corresponding to the two first fixing holes are provided in the connecting groove of the end piece body, the two first fixing holes are aligned with the two second fixing holes, and the connecting plate is stuck in the connecting groove and fixing pieces sequentially pass through the first fixing holes and the second fixing holes to connect and fix the connecting plate with the end piece body; the bar extends vertically from a center of one side of the connecting plate, and is connected to the controllable bending section; and an end of the connecting wire bypasses an outer wall of the end piece metal bridge and penetrates into the avoidance groove, to hide the connecting wire.

Preferably, a rotary groove is provided on an end of the end piece body away from the end piece metal bridge, rotating shaft holes are provided on two sidewalls of the rotary groove, an axis of the rotating shaft holes is parallel to the second direction, a rotating shaft penetrates the hinge along the second direction, and two ends of the rotating shaft are respectively stuck in the rotating shaft holes on the two sidewalls of the rotary groove, to enable the hinge to rotate around the rotating shaft relative to the end piece body.

Preferably, the rotating shaft holes are threaded holes, the rotating shaft is a bolt, and the bolt sequentially passes through the end piece body and the hinge, and is connected in the threaded holes through screw threads.

Preferably, the position adjusting end pieces are integrally formed

Preferably, further including wearing parts having electrical connection terminals, wherein the wearing parts are detachably installed on an end of the hinges away from the position adjusting end pieces, and the electrical connection terminals are electrically connected to the hinges.

Preferably, a waterproof soft rubber is further provided on an outer periphery of the hinges, to seal a gap between the hinges and the wearing parts.

Preferably, the wearing body is a glasses frame, and the wearing parts are glasses temples.

Preferably, a view port is provided on the hinge to observe a connection state of the connecting wire and the hinge, and a shielding cover is detachably packaged at the view port.

According to a second aspect, the technical solution of the present application provides a position adjusting end piece of smart glasses, the position adjusting end piece is connected between a wearing body and a hinge of the smart glasses, and includes:

an end piece body, wherein the end piece body is configured to connect with the hinge; and an end piece metal bridge, wherein the end piece metal bridge is preformed into a set shape, a first end of the end piece metal bridge is used to connect with the wearing body, a second end of the end piece metal bridge is connected to the end piece body, and a middle part of the end piece metal bridge has a controllable bending section;

wherein the controllable bending section is made of metal material, to enable the controllable bending section to rotate around a first direction within a first angle range, and to be maintained at any position within the first angle range; and to enable the controllable bending section to rotate around a second direction within a second angle range, and to be maintained at any position within the second angle range.

Compared with the prior art, the present application has the following beneficial effects:

when the smart glasses of the technical solutions of the present application are used, the position adjusting end piece can be rotated around the first direction in the first angle range, to adjust the forward tilt angle of the position adjusting end piece relative to the wearing body, so as to make the wearing body fit more closely with the wearing part of the user, thereby improving the wearing comfort; moreover, the position adjusting end piece can be rotated around the second direction in the second angle range, to adjust the opening angle of the hinges relative to the wearing body, so as to adjust the wearing size of the whole smart glasses, thereby adapting to the wearing requirements of the different users, and improving the applicability of the smart glasses.

4

Figure 1:
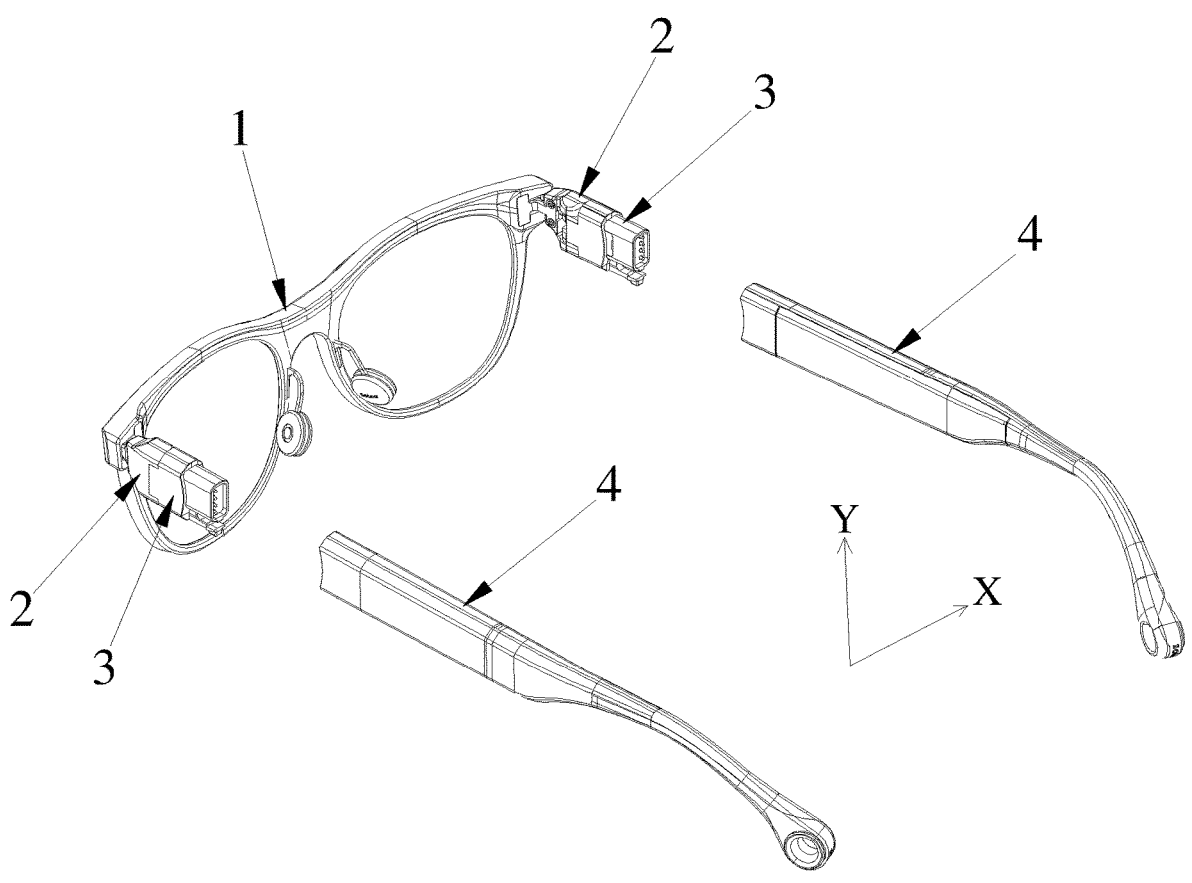
FIG. 1 is a structure schematic diagram of smart glasses according to an embodiment of the present application.
Figure 7:
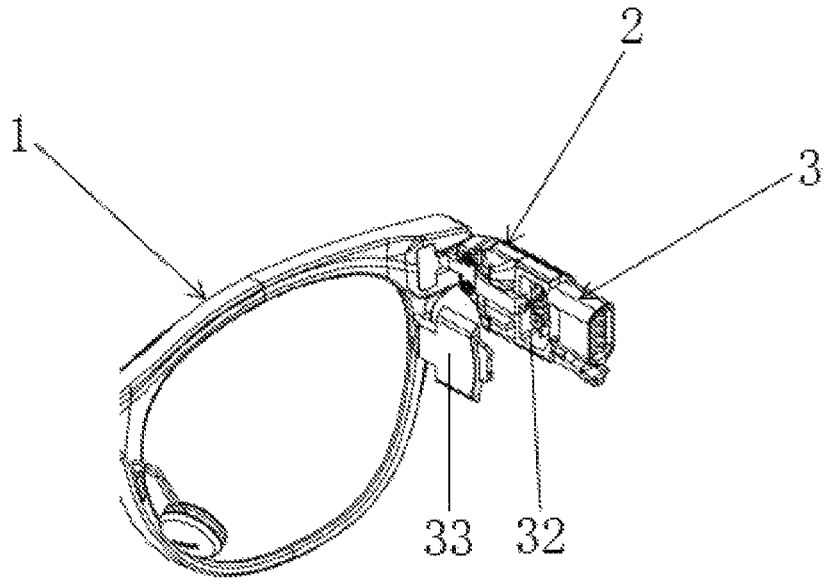

FIG. 7 is a partially exploded structure schematic diagram of FIG. 1.

REFERENCE NUMERALS 1. wearing body; 11. connecting wire; 12. position limiting groove; 13. screw;
2. position adjusting end piece; 21. end piece body; 22. end piece metal bridge; 23. fixing piece; 211. connecting groove; 212. avoidance groove; 213. rotary groove; 214. rotating shaft hole; 215. second fixing hole; 221. controllable bending section; 222. first end of the end piece metal bridge; 223. second end of the end piece metal bridge; 2221. fixing plate; 2222. fixing post; 2231. connecting plate; 2232. bar; 2233. first fixing hole;
3. hinge; 31. rotating shaft; 32. view port; 33. shielding cover; 34. electric connector; 35. waterproof soft rubber;
4. wearing part.

DETAILED DESCRIPTION

In order to make the objects, features and advantages of the present disclosure more obvious and easier to understand, the technical solutions in this embodiment will be clearly and completely described below with reference to the drawings. Apparently, the described embodiments are part of the embodiments of the present application, not all of the embodiments. All other embodiments obtained by those skilled in the art based on the embodiments of the present disclosure without creative efforts are within the scope of the present disclosure.

Figure 2:
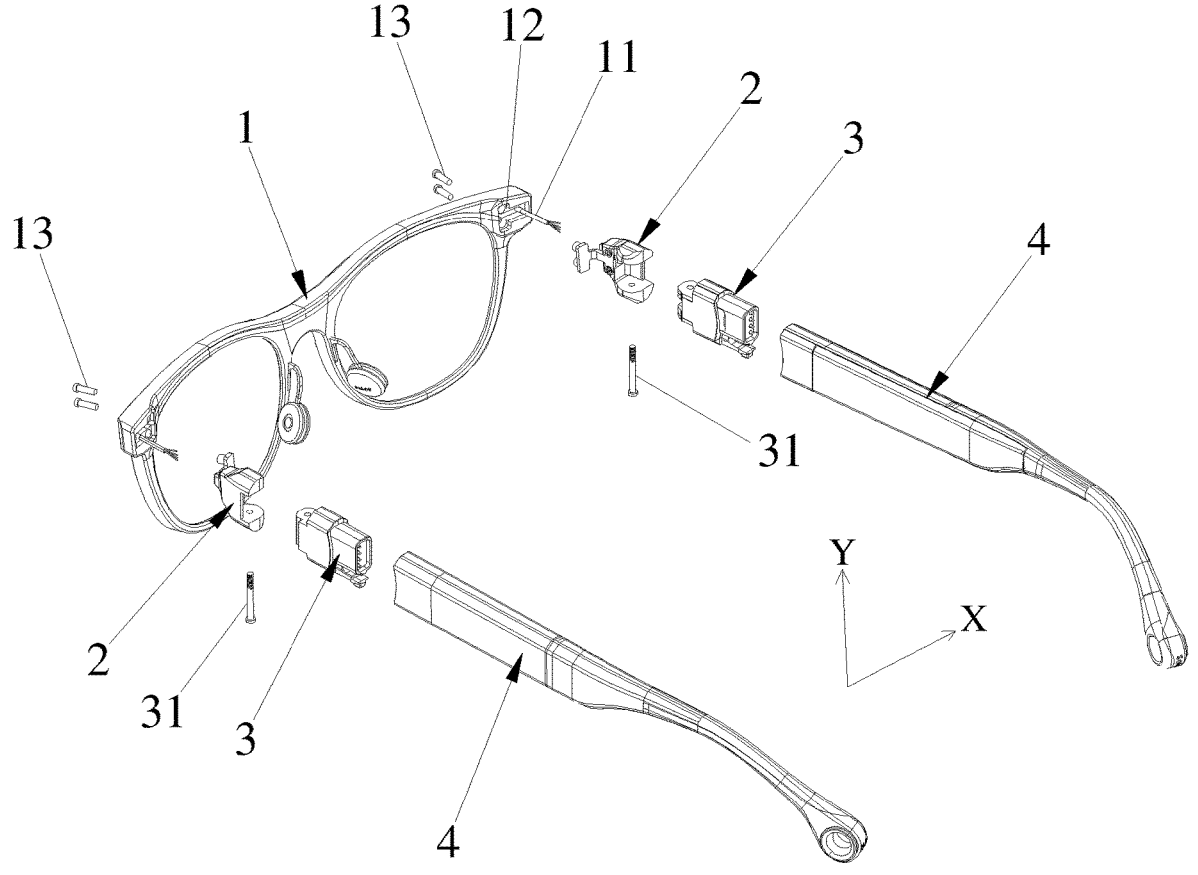
FIG. 2 is an exploded structure schematic diagram of the smart glasses according to an embodiment of the present application.

Referring to FIG. 1 and FIG. 2, smart glasses provided in an embodiment of the present application include: a wearing body 1, position adjusting end pieces 2, and hinges 3. The wearing body 1 is the main component that realizes the main functions of the smart glasses, and the position adjusting end pieces 2 are used to adjust a forward tilt angle of the wearing body 1, to improve the comfort of wearing, moreover, the position adjusting end pieces 2 are further used to adjust an opening angle of the wearing body 1, to adjust the wearing size of the whole smart glasses, so as to adapt to the use requirements of different users, and the hinges 3 serve as electrical connection components, and are electrically connected to the wearing body 1.

A connecting wire 11 is provided inside the wearing body 1, and two ends of the connecting wire 11 extend out of two sides of the wearing body 1 respectively; the position adjusting end pieces 2 are installed on the two sides of the wearing body 1, can be rotated around a first direction relative to the wearing body 1 within a first angle range, and can be maintained at any position within the first angle range, to adjust a forward tilt angle of the position adjusting end pieces 2 relative to the wearing body 1, and the first direction is parallel to a length direction of the wearing body 1 (i.e., the X direction in FIG. 1 and FIG. 2); the position adjusting end pieces 2 further can be rotated around a second direction relative to the wearing body 1 within a second angle range, and can be maintained at any position within the second angle range, to adjust an opening angle of the position adjusting end pieces 2 relative to the wearing body 1, and the second direction is parallel to a width direction of the wearing body 1 (i.e., the Y direction in FIG. 1 and FIG. 2); the hinges 3 are installed on the end of the position adjusting end pieces 2 away from the wearing body 1, and are electrically connected to the connecting wire 11.

Figure 3:
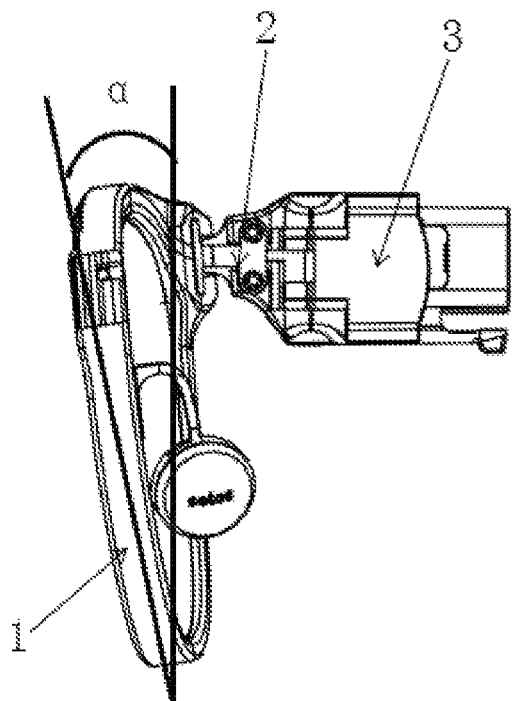
FIG. 3 is a side view of the structure of the smart glasses.

In this embodiment, referring to FIG. 3, a schematic diagram of the forward tilt angle α, it can be seen from FIG. 3 that the size of the forward tilt angle α is limited by two sides, where, the first side of the forward tilt angle α is a straight line in the vertical direction formed vertically from the bottom of the frame, and the second side of the forward tilt angle α is a straight line sloping to the top left from the bottom of the frame to the top of the frame. Different forward tilt angles α result in different degrees of fit between the frame of the smart glasses and the face of the user, during specific use, the position adjusting end pieces 2 can be rotated around the first direction within the first angle range, so as to adjust the forward tilt angle α of the position adjusting end pieces 2 relative to the wearing body 1, and it can make the wearing body fit more closely with the wearing part of the user, thereby improving the comfort of wearing.

Figure 4:
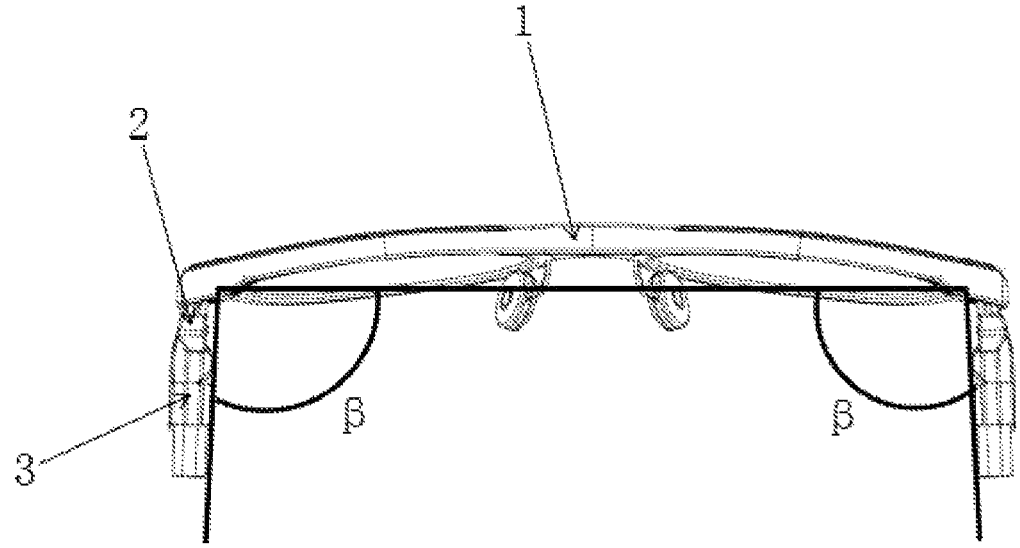
FIG. 4 is a top view of the structure of the smart glasses.

Moreover, referring to FIG. 4, a schematic diagram of the opening angle β, it can be seen from FIG. 4 that the size of the opening angle β is also limited by two sides, where, the first side of the opening angle β is a horizontal straight line formed from the left end of the frame to the right end of the frame, and the second side of the opening angle β is a straight line where a glasses temple is located when the smart glasses are opened. Different opening angle β result in different opening angles of the temples of the smart glasses, during specific use, the position adjusting end pieces 2 can be rotated around the second direction within the second angle, so as to adjust the position adjusting end pieces 2 relative to the wearing body 1, the whole smart glasses can be adjusted to a suitable wearing size by adjusting the opening angle β to a suitable angle, so as to adapt to the wearing requirements of different users, and the applicability of the smart glasses is improved.

Figure 5:
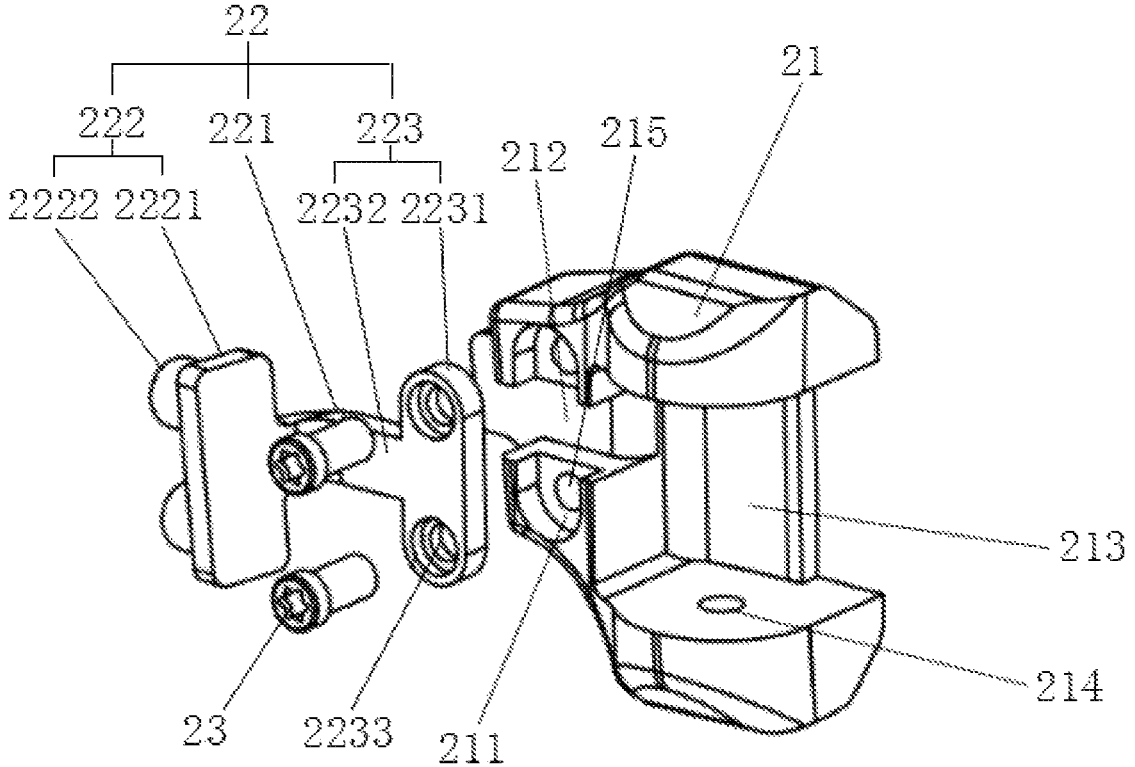
FIG. 5 is an exploded structure schematic diagram of a position adjusting end piece in FIG. 2.

Referring to FIG. 5, in the above-mentioned embodiments, preferably, the position adjusting end piece 2 includes an end piece body 21 and an end piece metal bridge 22; the end piece metal bridge 22 is preformed into a set shape; the first end 222 of the end piece metal bridge 22 is detachably connected to the wearing body 1, the second end 223 of the end piece metal bridge 22 is detachably connected to the end piece body 21, and the middle part of the end piece metal bridge 22 has a controllable bending section 221; the controllable bending section 221 can rotate around the first direction relative to the wearing body 1 within the first angle range, to adjust the forward tilt angle of the end piece body 21 relative to the wearing body 1, and the end piece body 21 is detachably connected to the hinge 3; and the controllable bending section 221 further can rotate around the second direction relative to the wearing body 1 within the second angle range, to adjust the opening angle of the wearing body 1.

Specifically, in this embodiment, the position adjusting end piece 2 is composed of two parts, where the end piece body 21 can be made of the metal material or plastic material, the end piece metal bridge 22 is made of the metal material, the first end 222 of the end piece metal bridge 22 is connected to the wearing body 1, the second end 223 of the end piece metal bridge is connected to the end piece body 21, since the middle part of the end piece metal bridge 22 is a controllable bending section 221 made of the metal material, it has certain shaping and shape retention capabilities, when the controllable bending section 221 rotates a first angle around the first direction relative to the wearing body 1 (the first angle should be within the first angle range), the controllable bending section 221 will remain in this position, and the end piece body 21 and the hinges 3 installed on the end piece body 21 will change the angle accordingly with the rotation of the controllable bending section 221, so that the user can easily adjust the forward tilt angle α according to his own needs, to make the wearing body 1 fit more closely to the face of the user, and the comfort of wearing comfort is improved. Moreover, when the controllable bending section 221 rotates a second angle around the second direction relative to the wearing body 1 (the second angle should be within the second angle range), the controllable bending section 221 will remain in a corresponding position, and the end piece body 21 and the hinges 3 installed on the end piece body 21 will change the angle accordingly with the rotation of the controllable bending section 221, so that the user can easily adjust the opening angle β according to his own needs, so that the smart glasses can be suitable for different people to wear, and the applicability of wearing is improved. The specific size of the first angle and the second angle is related to the metal material used in the controllable bending section 221, and is determined by the properties of the metal material itself.

It should be understood that in the above-mentioned embodiments, designing the position adjusting end pieces 2 as a split structure is only one preferable embodiment among them, in other embodiments, the positioning adjusting end piece 2 can also be integrally formed or the end piece body 21 and the end piece metal bridge 22 are connected into a whole by secondary injection molding, and the specific selection can be made adaptively according to one's own needs.

Specifically, in this embodiment, the end piece metal bridge 22 is preformed into an L-shaped shape, the first end 222 of the end piece metal bridge is arranged substantially parallel to the main surface of the wearing body 1, and is connected to the wearing body 1. The second end 223 of the end piece metal bridge is arranged substantially perpendicularly to the first end, and is connected to the end piece body 21. The controllable bending section 221 is connected between the first end 222 and the second end 223.

Referring to FIG. 2, in this embodiment, preferably, the first end 222 of the end piece metal bridge includes a fixing plate 2221 connected to the controllable bending section 221, and a fixing post 2222 extending from the fixing plate 2221. A position limiting groove 12 with a shape matching to the fixing post 2222 is provided on the wearing body 1, the fixing post 2222 of the end piece metal bridge 22 is embedded in the position limiting groove 12, and the fixing plate 2221 is connected to the wearing body 1 through the screws 13 (as shown in FIG. 2). Specifically, in this embodiment, the first end 222 of the end piece metal bridge 22 can be positioned by embedding the fixing post 2222 of the first end of the end piece metal bridge 22 in the position limiting groove 12, so as to improve the assembly accuracy of the end piece metal bridge 22, and then, the end piece metal bridge 22 is detachably connected to the wearing body 1 by means of screw connection, thereby improving the convenience of assembly and disassembly.

In the embodiment, two first fixing holes 2233 are provided on the second end 223 of the end piece metal bridge, two second fixing holes 215 corresponding to the two first fixing holes 2233 of the end piece metal bridge are provided on the end piece body 21, the first fixing holes 2233 are aligned with the second fixing holes 215, fixing pieces 23 (e.g., bolts) sequentially pass through the first fixing holes 2233 and the second fixing holes 215 to connect and fix the end piece metal bridge 22 with the end piece body 21. The second end 223 of the end piece metal bridge is roughly T-shaped and flat, and includes a connecting plate 2231 and a bar 2232 perpendicular to each other, the bar extends vertically from the center of one side of the connecting plate 2231 and is connected with the controllable bending section 221. The two first fixing holes 2233 are arranged at two ends of the connecting plate 2231, and symmetrically located at two sides of the bar 2232. Further, a connecting groove 211 for holding the connecting plate 2231 of the end piece metal bridge is formed on the end piece body 21, and the two second fixing holes 215 are arranged at the bottom of the connecting groove 211. The connecting plate 2231 of the end piece metal bridge is stuck in the connecting groove 221 and is bolted to the end piece body 21. Preferably, an avoidance groove 212 is provided in the middle of the connecting groove 211 along the extending direction parallel to the bar 2232 of the end piece metal bridge, the avoidance groove 212 cuts off the connecting groove 211, the end of the connecting wire 11 bypasses the outer wall of the end piece metal bridge 22 and penetrates into the avoidance groove 212, so that it is shielded by the second end of the end piece metal bridge 22, to hide the connecting wire 11. Specifically, in this embodiment, the end piece metal bridge 22 is first connected to the end piece body 21 through the bolts, after the end piece metal bridge 22 is connected with the end piece body 21, the end piece metal bridge 22, the end piece body 21 and the avoidance groove 212 jointly form an avoidance space, after the end of the connecting wire 11 is passed out of the wearing body 1, it first bypasses the controllable bending section 221 of the end piece metal bridge 22, uses the controllable bending section 221 to shield the connecting wire 11, at the same time, the connecting wire 11 penetrates into the avoidance space, to hide the connecting wire 11, so as to prevent the connecting wire 11 from being exposed and affecting the aesthetics of the smart glasses.

In the above-described embodiments, preferably, a rotary groove 213 is provided on an end of the end piece body 21 away from the end piece metal bridge 22, rotating shaft holes 214 are provided on two sidewalls of the rotary groove 213, an axis of the rotating shaft holes 214 is parallel to the second direction, a rotating shaft 31 penetrates the hinge 3 along the second direction, and two ends of the rotating shaft 31 are respectively stuck in the rotating shaft holes 214 on the two sidewalls of the rotary groove 213, so as to enable the hinge 3 to rotate around the rotating shaft 31 relative to the end piece body 21. Specifically, in this embodiment, two ends of the rotating shaft 31 are respectively stuck in the rotating shaft holes 214 on the two sidewalls of the rotary groove 213 by putting the hinge 3 into the rotary groove 213, the hinge 3 is opened when it is needed, and the hinge 3 is closed when it is not needed.

In the above-described embodiments, preferably, the rotating shaft holes 214 are threaded holes, the rotating shaft 31 is a bolt, and the bolt 31 sequentially passes through the end piece body 21 and the hinge 3, and is connected in the threaded holes through the screw threads. Specifically, in this embodiment, during specific assembly, first the hinge 3 is put into the rotary groove 213, and the shaft hole of the hinge 3 is aligned with the rotating shaft holes 214 on the two sides of the rotary groove 213, then, the bolt 31 is sequentially passed through the end piece body 21 and the hinge 3, and finally the threaded part of the bolt 31 is connected in the threaded holes 214 through the screw threads. Thus, the convenience of assembly and disassembly can be improved, and this connection manner has better stability and reliability.

Figure 6:
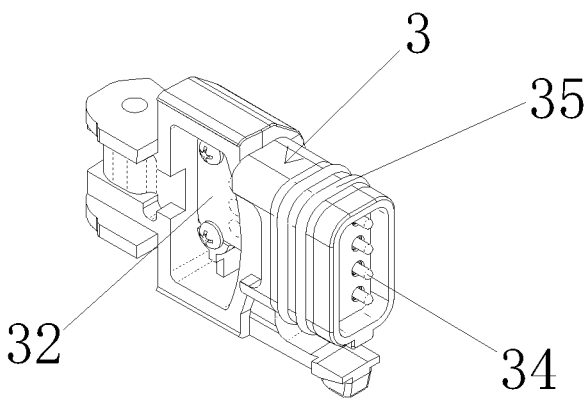
FIG. 6 is a structure schematic diagram of a hinge according to another embodiment of the present application.

Referring to FIG. 1 and FIG. 2, in the above-described embodiments, preferably, further including wearing parts 4, the wearing parts 4 have electrical connection terminals, the wearing parts 4 are detachably installed on an end of the hinges 3 away from the position adjusting end pieces 2, referring to FIG. 6, the electrical connection terminals are electrically connected to the electrical connectors 34 of the hinge 3. Specifically, in this embodiment, the smart glasses are smart glasses, the wearing body 1 is a glasses frame, the wearing parts 4 are glasses temples, where, electronic components and control buttons are provided in the glasses temples, and corresponding smart functions can be realized by operating the corresponding control buttons on the glasses temples. In addition, the detachable connection between the wearing part and the hinge 3 may be a bolted connection, a threaded connection, a magnetic attraction connection or a snap connection, and is not specifically limited herein.

Referring to FIG. 6, in the above-described embodiments, preferably, a waterproof soft rubber 35 is further provided on an outer periphery of the hinge 3, to seal a gap between the hinge 3 and the wearing part. Specifically, the waterproof soft rubber 35 is a ring of annular protrusion disposed on the outer periphery of the hinge 3, the wearing part 4 is sleeved on one side of the hinge 3 away from the position adjusting end piece 2, so as to use the waterproof soft rubber 35 to seal the gap between the hinge 3 and the wearing part 4, thereby achieving the waterproof effect, avoiding affecting the connection of the circuit during rain, and improving the safety of using the smart glasses.

Referring to FIG. 7, in the above-described embodiments, preferably, a view port 32 is provided on the hinge 3, to observe the connection state of the connecting wire 11 and the hinge 3, and a shielding cover 33 is detachably packaged at the view port 32. Specifically, in this embodiment, the shielding cover 33 is detachable, the shielding cover 33 can be removed when the poor contact occurs, to observe whether the connection between the connecting wire 11 and the hinge 3 is intact, it means that the internal parts of the wearable device have malfunctioned when the connection between the connecting wire 11 and the hinge 3 is intact, and it is just need to reconnect them together when the connection between the connecting wire 11 and the hinge 3 is disconnected, so it can help determine whether the smart glasses are abnormal, so as to perform a simple repair to the smart glasses.

Taking the smart glasses as an example, the following is a detailed description of the entire assembly process of the smart glasses:

S10, threading the connecting wire 11 onto the glasses frame 1 in advance;

S20, connecting the end piece bodies 21 and the end piece metal bridges 22 through the bolts to form the position adjusting end pieces 2;

S30, fixing the end piece metal bridges 22 on the glasses frame 1 through the screws, and connecting the hinges 3 with the end piece body 21 through the buckles or magnets; at the same time, during this process, the connecting wire 11 is hidden on the outer wall of the end piece metal bridges 22 and passes through the avoidance grooves 212, and then is electrically connected to the hinges 3;

S40, installing the two glasses temples on the two hinges 3 respectively, and electrically connecting the electrical connection terminals on the temples to the hinges 3, specifically, performing the connection by various manners such as buckles, magnets, threads, bolts, and the like.

Moreover, the above-mentioned assembly steps can be reversed, and it is just need to finally complete the four above-mentioned steps to assemble the all parts together.

To sum up, the smart glasses provided by the embodiments of the present application, can not only fine-tune the shape of the smart glasses, so as to improve the comfort for the user to wear; but also adjust the size of the whole smart glasses, so as to adapt to the wearing requirements of more users; moreover, the design of the end piece body 21 and the end piece metal bridge 22 can skillfully hide the connecting wire 11, so as to improve the aesthetic of the whole smart glasses; furthermore, the connection manner of the position adjusting end piece 2 itself, and the connection manner of the position adjusting end pieces 2 with the wearing body 1 and the hinges 3 are relatively stable and convenient, so as to improve the reliability and the convenience of assembly and disassembly of the whole smart glasses.

In the description of the specification, the description with reference to the terms "one embodiment", "some embodiments", "examples", "specific examples" or "some examples", etc., means that specific features, structures, materials or characteristics described in connection with the embodiment or example are embraced in at least one embodiment or example of the present application. Moreover, the described specific features, structures, materials or characteristics may be combined in any suitable manners in one or more embodiments or examples. In addition, where no contradiction exists, the various embodiments or examples and features of various embodiments or examples described in this specification can be combined by those skilled in the art.

In addition, the terms "first", "second", "third", and the like are only used for distinguishing, and cannot be understood as indicating or implying relative importance or implicitly indicating the quantity of indicated technical features. Thus, features defined as "first" and "second" may explicitly or implicitly include at least one of the features. In the description of the present application, "plurality" means two or more than two, unless otherwise explicitly and specifically limited.

The above are only specific embodiments of the present application, but the protection scope of the present application is not limited thereto, any variations or substitutions that may occur to those skilled in the art within the scope of the disclosure of the present application are intended to fall within the scope of the present application. Therefore, the protection scope of the present application shall be subject to the protection scope defined by the claims.

What is claimed is:

1. Smart glasses, comprising:
a wearing body, wherein a connecting wire is provided in the wearing body, and two ends of the connecting wire extend out of two sides of the wearing body respectively;
position adjusting end pieces installed on the two sides of the wearing body, wherein the position adjusting end pieces can be rotated around a first direction relative to the wearing body within a first angle range, and can be maintained at any position within the first angle range, to adjust a forward tilt angle of the position adjusting end pieces relative to the wearing body, and the first direction is parallel to a length direction of the wearing body; the position adjusting end pieces further can be rotated around a second direction relative to the wearing body within a second angle range, and can be maintained at any position within the second angle range, to adjust an opening angle of the position adjusting end pieces relative to the wearing body, and the second direction is parallel to a width direction of the wearing body; and
hinges, wherein the hinges are installed on an end of the position adjusting end pieces away from the wearing body, and are electrically connected to the connecting wire;
wherein the smart glasses further comprise wearing parts having electrical connection terminals, wherein the wearing parts are detachably installed on an end of the hinges away from the position adjusting end pieces, and the electrical connection terminals are electrically connected to the hinges.

2. The smart glasses of claim 1, wherein the position adjusting end piece comprises: an end piece body and an end piece metal bridge;
the end piece metal bridge is preformed into a set shape, a first end of the end piece metal bridge is detachably connected to the wearing body, a second end of the end piece metal bridge is detachably connected to the end piece body, and a middle part of the end piece metal bridge has a controllable bending section; and
the controllable bending section is made of metal material, to enable the controllable bending section to rotate around the first direction within the first angle range, and to be maintained at the any position within the first angle range; and to enable the controllable bending section to rotate around the second direction within the second angle range, and to be maintained at the any position within the second angle range.

3. The smart glasses of claim 2, wherein the first end of the end piece metal bridge comprises: a fixing plate connected to the controllable bending section, and a fixing post extending from the fixing plate; a position limiting groove with a shape matching to the fixing post is provided on the wearing body, the fixing post is embedded in the position limiting groove, and the fixing plate is connected to the wearing body through screws.

4. The smart glasses of claim 2, wherein a connecting groove is provided on the end piece body, and an avoidance groove is provided at a bottom of the connecting groove along a third direction and runs through the connecting groove; and
the second end of the end piece metal bridge comprises a connecting plate and a bar perpendicular to each other, two first fixing holes are provided on the connecting plate, two second fixing holes corresponding to the two first fixing holes are provided in the connecting groove of the end piece body, the two first fixing holes are aligned with the two second fixing holes, and the connecting plate is stuck in the connecting groove and fixing pieces sequentially pass through the first fixing holes and the second fixing holes to connect and fix the connecting plate with the end piece body; the bar extends vertically from a center of one side of the connecting plate, and is connected to the controllable bending section; and an end of the connecting wire bypasses an outer wall of the end piece metal bridge and penetrates into the avoidance groove, to hide the connecting wire.

5. The smart glasses of claim 2, wherein a rotary groove is provided on an end of the end piece body away from the end piece metal bridge, rotating shaft holes are provided on two sidewalls of the rotary groove, an axis of the rotating shaft holes is parallel to the second direction, a rotating shaft penetrates the hinge along the second direction, and two ends of the rotating shaft are respectively stuck in the rotating shaft holes on the two sidewalls of the rotary groove, to enable the hinge to rotate around the rotating shaft relative to the end piece body.

6. The smart glasses of claim 5, wherein the rotating shaft holes are threaded holes, the rotating shaft is a bolt, and the bolt sequentially passes through the end piece body and the hinge, and is connected in the threaded holes by screw threads.

7. The smart glasses of claim 1, wherein the position adjusting end pieces are integrally formed.

8. The smart glasses of claim 1, wherein a waterproof soft rubber is further provided on an outer periphery of the hinges, to seal a gap between the hinges and the wearing parts.

9. The smart glasses of claim 1, wherein the wearing body is a glasses frame, and the wearing parts are glasses temples.

10. The smart glasses of claim 1, wherein a view port is provided on the hinge to observe a connection state of the connecting wire and the hinge, and a shielding cover is detachably packaged at the view port.

11. A position adjusting end piece of smart glasses, for connecting a wearing body and a hinge of the smart glasses, comprising:

an end piece body, wherein the end piece body is configured to connect with the hinge; and an end piece metal bridge, wherein the end piece metal bridge is preformed into a set shape, a first end of the end piece metal bridge is configured to connect with the wearing body, a second end of the end piece metal bridge is connected to the end piece body, and a middle part of the end piece metal bridge has a controllable bending section;

wherein the controllable bending section is made of metal material, to enable the controllable bending section to rotate around a first direction within a first angle range, and to be maintained at any position within the first angle range; and to enable the controllable bending section to rotate around a second direction within a second angle range, and to be maintained at any position within the second angle range;

wherein a first end of the end piece metal bridge comprises: a fixing plate connected to the controllable bending section, and a fixing post extending from the fixing plate.

12. The position adjusting end piece of the smart glasses of claim 11, wherein a connecting groove is provided on the end piece body, an avoidance groove is provided at a bottom of the connecting groove along a third direction and runs through the connecting groove; and a second end of the end piece metal bridge comprises a connecting plate and a bar perpendicular to each other, two first fixing holes are provided on the connecting plate, two second fixing holes corresponding to the two first fixing holes are provided in the connecting groove of the end piece body, the two first fixing holes are aligned with the two second fixing holes, the connecting plate is stuck in the connecting groove and fixing pieces sequentially pass through the first fixing holes and the second fixing holes to connect and fix the connecting plate with the end piece body; and the bar extends vertically from a center of one side of the connecting plate, and is connected to the controllable bending section.

13. The position adjusting end piece of the smart glasses of claim 11, wherein a rotary groove is provided on an end of the end piece body away from the end piece metal bridge, rotating shaft holes are provided on two sidewalls of the rotary groove, and an axis of the rotating shaft holes is parallel to the second direction.

* * * * *